(12) United States Patent
Hirman et al.

(10) Patent No.: US 10,934,670 B1
(45) Date of Patent: Mar. 2, 2021

(54) QUICK CHANGE CHAMBER FOR MILLING MACHINE

(71) Applicant: Caterpillar Paving Products Inc., Brooklyn Park, MN (US)

(72) Inventors: Colton J. Hirman, Maple Grove, MN (US); Nathan L. Mashek, Albertville, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/567,442

(22) Filed: Sep. 11, 2019

(51) Int. Cl.
| | |
|---|---|
| *E01C 23/088* | (2006.01) |
| *B62D 65/02* | (2006.01) |
| *E01C 23/12* | (2006.01) |
| *E02F 9/22* | (2006.01) |
| *E02F 3/36* | (2006.01) |

(52) U.S. Cl.
CPC ............ *E01C 23/088* (2013.01); *B62D 65/02* (2013.01); *B62B 2202/02* (2013.01); *B62B 2203/10* (2013.01); *E01C 23/127* (2013.01); *E02F 3/3663* (2013.01); *E02F 9/2271* (2013.01)

(58) Field of Classification Search
CPC ........ E01C 23/088; E01C 23/09; E01C 23/12; Y10T 292/0863; Y10T 292/0886; F16B 21/02; B62D 65/02
USPC ............ 404/90, 93–94; 299/36.1, 39.1, 39.2, 299/39.4, 39.6; 292/57, 63; 411/349, 411/549, 553
See application file for complete search history.

(56) References Cited

U.S. PATENT DOCUMENTS

| | | | |
|---|---|---|---|
| 4,293,984 A | * | 10/1981 | Kaufmann, Jr. ........ F16B 21/04 411/553 |
| 4,928,386 A | | 5/1990 | Schupp et al. |
| 5,107,610 A | | 4/1992 | Fusco |
| 5,378,081 A | | 1/1995 | Swisher, Jr. |
| 5,474,397 A | | 12/1995 | Lyons |
| 6,227,620 B1 | | 5/2001 | Page |
| 7,721,831 B2 | | 5/2010 | Smolders et al. |
| 7,942,604 B2 | | 5/2011 | Willis et al. |
| 8,770,668 B2 | | 7/2014 | Hall et al. |
| 9,033,423 B2 | | 5/2015 | Darscheid et al. |
| 9,951,483 B2 | | 4/2018 | Roetsch et al. |
| 10,174,465 B2 | | 1/2019 | Steeg et al. |
| 10,183,606 B2 | | 1/2019 | Schomaker et al. |

(Continued)

FOREIGN PATENT DOCUMENTS

| | | |
|---|---|---|
| CN | 1182152 | 5/1998 |
| JP | 61087032 | 5/1986 |

OTHER PUBLICATIONS

"U.S. Appl. No. 15/632,996, Non Final Office Action dated Sep. 28, 2018", 14 pgs.

(Continued)

*Primary Examiner* — Sunil Singh
(74) *Attorney, Agent, or Firm* — Oblon, McClelland, Maier & Neustadt

(57) ABSTRACT

A milling machine can include a frame; a milling assembly including a drum housing; and a connecting assembly for mounting the drum housing to the frame, the connecting assembly including: a mounting member on one of the frame or the drum housing; and a locking mechanism fixed to the other one of the frame or the drum housing, the locking mechanism including a rotatable angled-plane pin configured to connect to the mounting member.

16 Claims, 6 Drawing Sheets

(56) References Cited

U.S. PATENT DOCUMENTS

| | | |
|---|---|---|
| 10,370,804 B2 | 8/2019 | Hirman |
| 2005/0103947 A1 | 5/2005 | Beller |
| 2010/0237681 A1 | 9/2010 | Von Schonebeck et al. |
| 2011/0280648 A1 | 11/2011 | Malacrino et al. |
| 2012/0131783 A1 | 5/2012 | Hall et al. |
| 2012/0284989 A1 | 11/2012 | Busley et al. |
| 2013/0000996 A1 | 1/2013 | Miller et al. |
| 2016/0004037 A1 | 1/2016 | Chen et al. |
| 2016/0040371 A1 | 2/2016 | Roetsch et al. |
| 2016/0040372 A1* | 2/2016 | Eiden .................. E01C 23/088 29/426.1 |
| 2017/0107684 A1 | 4/2017 | Dong |
| 2017/0130407 A1* | 5/2017 | Laux .................... E01C 23/088 |
| 2017/0284039 A1 | 10/2017 | Busley et al. |
| 2017/0328018 A1* | 11/2017 | Mannebach .......... E01C 23/088 |
| 2018/0002876 A1 | 1/2018 | Hirman et al. |
| 2019/0136469 A1 | 5/2019 | Steeg et al. |

OTHER PUBLICATIONS

"U.S. Appl. No. 15/632,996, Preliminary Amendment filed Jun. 26, 2017", 6 pgs.

"European Application Serial No. 16177224.9, Extended European Search Report dated Sep. 29, 2016", 7 pgs.

"U.S. Appl. No. 15/632,996, filed Dec. 13, 2018 to Non Final Office Action dated Sep. 28, 2018", 9 pgs.

"U.S. Appl. No. 15/632,996, Notice of Allowance dated Mar. 20, 2019", 5 pgs.

"U.S. Appl. No. 15/632,996, Supplemental Notice of Allowability dated May 13, 2019", 4 pgs.

\* cited by examiner

US 10,934,670 B1

QUICK CHANGE CHAMBER FOR MILLING MACHINE

TECHNICAL FIELD

The present disclosure generally relates to a milling machine. More particularly, the present disclosure relates to a system and method to change the milling assembly chamber of the milling machine.

BACKGROUND

Milling machines can include machines such as cold planers and reclaimers. Cold planers are powered machines used to remove at least part of a surface of a paved area such as a road, bridge, or parking lot. Typically, cold planers include a frame, a power source, a milling assembly positioned below the frame, and a conveyor system. The milling assembly includes a cutting rotor having numerous cutting bits disposed thereon. As power from the power source is transferred to the milling assembly, this power is further transferred to the cutting rotor, thereby rotating the cutting rotor about its axis. As the rotor rotates, its cutting bits engage the hardened asphalt, concrete or other materials of an existing surface of a paved area, thereby removing layers of these existing structures. The spinning action of the cutting bits transfers these removed layers to the conveyor system which transports the removed material to a separate powered machine such as a haul truck for removal from a work site.

It may be desirable to remove the milling assembly from the frame, for example to allow transportation of the cold planer or to replace a worn or damaged milling assembly. Furthermore, it may be desirable to switch between milling assemblies having different widths. Some operators want the ability to quickly and easily swap out chambers for different width rotors (e.g. using a large machine to mill a narrow strip of road surface).

US 2018/0002876 discloses a ground milling machine comprising a replaceable milling drum unit.

SUMMARY

In an example according to this disclosure, a milling machine can include a frame; a milling assembly including a drum housing; and a connecting assembly for mounting the drum housing to the frame, the connecting assembly including: a mounting member on one of the frame or the drum housing; and a locking mechanism fixed to the other one of the frame or the drum housing, the locking mechanism including a rotatable angled-plane pin configured to connect to the mounting member.

In one example, a milling assembly can include a drum housing holding a rotatable milling drum; and a locking mechanism fixed to the drum housing for mounting the milling assembly to a frame of a milling machine, the locking mechanism including a rotatable angled-plane pin configured to connect to a corresponding mounting member on the frame.

In one example, a method of connecting a milling assembly to a milling machine frame can include positioning a locking mechanism fixed to one of a drum housing of a milling assembly or a frame of the milling machine proximate a mounting member on the other one of the frame or the drum housing, the locking mechanism including a rotatable angled-plane pin configured to connect to the mounting member; and rotating the rotatable angle-planed pin until it engages with the mounting member and clamps the drum housing to the frame.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
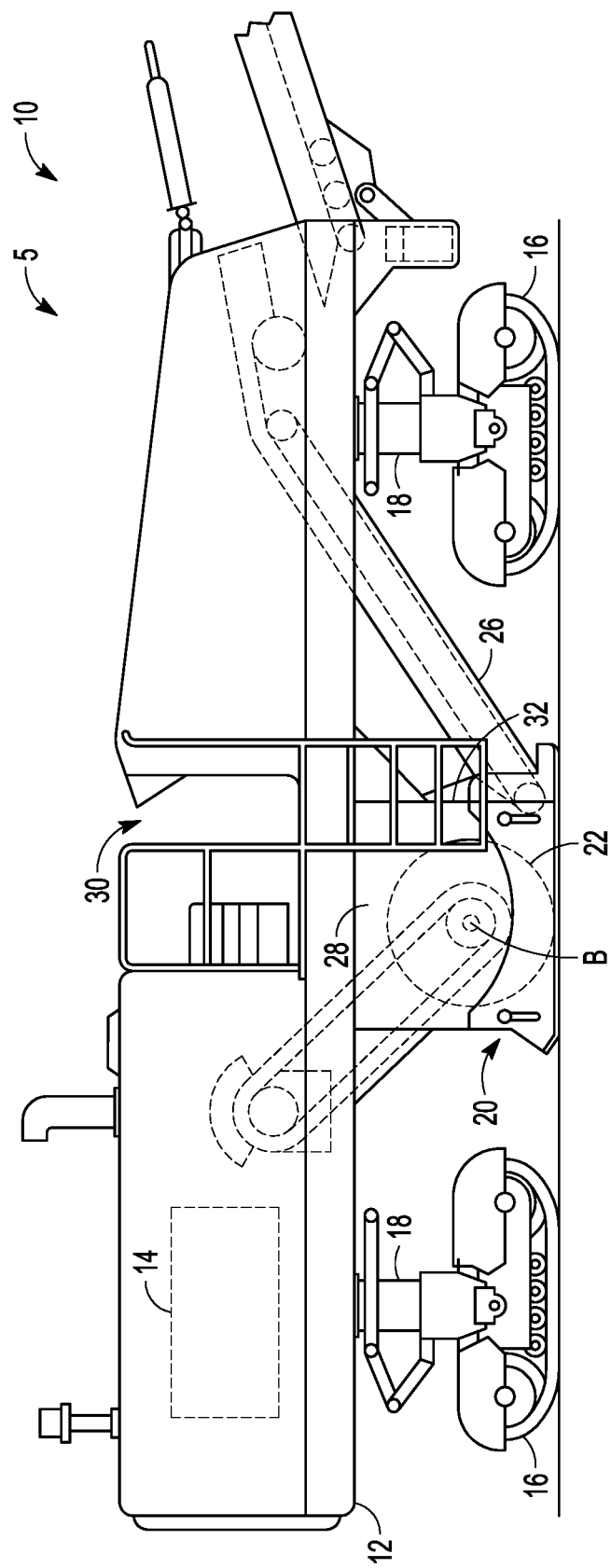
FIG. 1 shows a side view of a cold planer, in accordance with one embodiment.

FIG. 1 shows aside view of a milling machine 5, in accordance with one embodiment. In this example, the milling machine 5 is a cold planer 10. The cold planer 10 includes a frame 12, and a power source 14 connected to the frame 12. The power source 14 may be provided in any number of different forms including, but not limited to, Otto and Diesel cycle internal combustion engines, electric motors, hybrid engines and the like.

The frame 12 is supported by transportation devices 16 via lifting columns 18. The transportation devices 16 may be any kind of ground-engaging device that allows to move the cold planer 10 in a forward direction over a ground surface, for example a paved road or a ground already processed by the cold planer 10. For example, in the shown embodiment, the transportation devices 16 are configured as track assemblies. The lifting columns 18 are configured to raise and lower the frame 12 relative to the transportation devices and the ground.

The cold planer 10 further includes a milling assembly 20 connected to the frame 12. The milling assembly 20 includes a drum housing 28 holding a rotatable cutting rotor 22 operatively connected to the power source 14. The cutting rotor 22 can be rotated about a drum or housing axis extending in a direction perpendicular to the frame axis. As the rotatable cutting rotor 22 spins about its drum axis, cutting bits on the cutting rotor 22 can engage hardened materials, such as, for example, asphalt and concrete, of existing roadways, bridges, parking lots and the like. As the cutting bits engage such hardened materials, the cutting bits remove layers of these hardened materials. The spinning action of the rotatable drum 22 and its cutting bits then transfers the hardened materials to a first stage conveyor 26 via a discharge port 32 on the drum housing 28. The first stage conveyor 26 can be coupled to the frame 12 and located at or near the discharge port 32.

The drum housing 28 includes front and rear walls, and atop cover positioned above the cutting rotor 22. Furthermore, the drum housing 28 includes lateral covers on the left and right sides of the cutting rotor 22 with respect to a travel direction of the cold planer 10. The drum housing 28 is open toward the ground so that the cutting rotor 22 can engage in the ground from the drum housing 28. The drum housing includes the discharge port 32 in a front wall to discharge material to the first stage conveyor 26, which is located at or near the discharge port 32.

Some operators require the ability to quickly and easily swap out chambers for different widths of rotors. The present system relates to an assembly for mounting the drum housing of a milling assembly to a frame of a cold planer, for example. For example, the drum housing 28 can be attached to and removed from the frame 12 in a quick and easy manner which will be described with reference to FIGS. 2-6.

The cold planer 10 further includes an operator station or platform 30 including an operator interface for inputting commands to a control system for controlling the cold planer 10, and for outputting information related to an operation of the cold planer 10.

Figure 2:
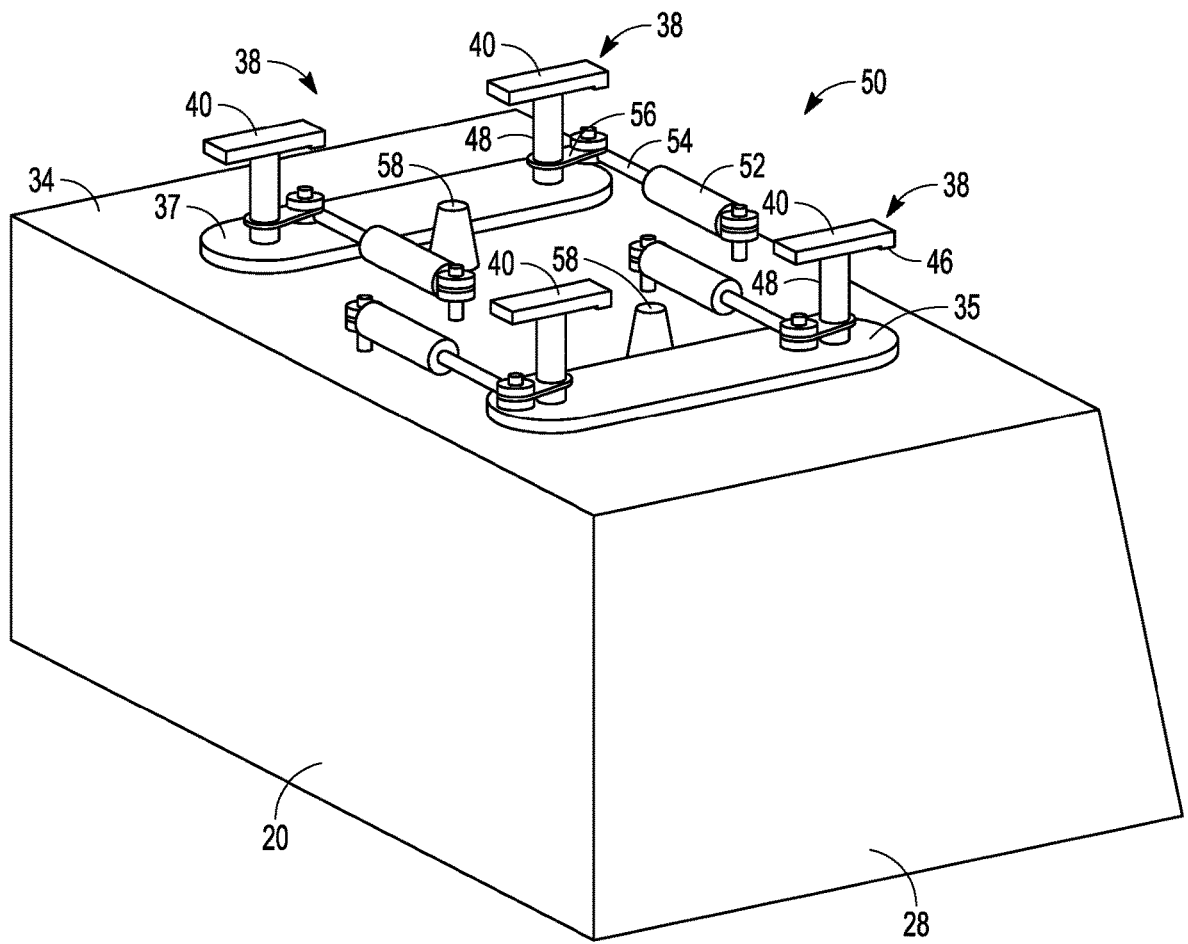
FIG. 2 shows a perspective view of a milling assembly, in accordance with one embodiment.
Figure 3:
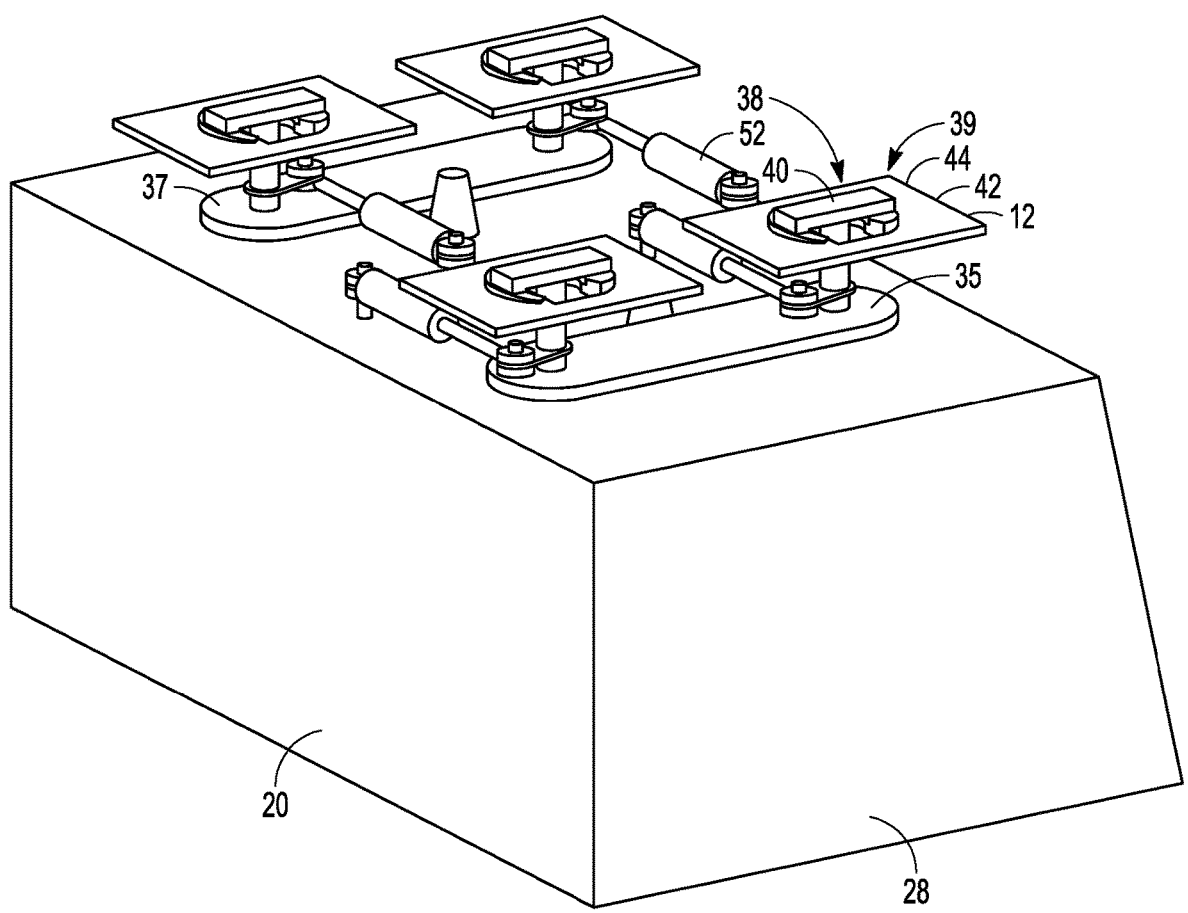
FIG. 3 shows a perspective view of the milling assembly of FIG. 2, in accordance with one embodiment.

FIGS. 2-3 show perspective view of the connecting system for connecting the milling assembly 20 to the frame 12, in accordance with one embodiment. FIG. 2 shows a perspective view of the milling assembly 20, while FIG. 3 shows a perspective view of the milling assembly 20 and portions of the frame 12.

In one embodiment, a connecting assembly 39 is provided to connect the drum housing to the frame. In one embodiment, the connecting assembly 39 can include a mounting member 42 coupled to the frame 12, and one or more locking mechanisms 38 fixed to the drum housing 28 for mounting the milling assembly 20 to the frame 12. In one example, the locking mechanisms 38 can include one or more rotatable angled-plane pins 40 configured to connect to the mounting member 42. By angled-plane pin is meant that the lower surface of the head of the pin is not planar and includes one or more angled portions, as will be discussed below. Here, the mounting member 42 can include one or more receiving portions on the frame 12 to receive the rotatable angled-plane pin 40. For example, the mounting member 42 can include one or more slots 44 formed in the frame 12.

In one embodiment, the angled-plane pins 40 include an angular T-shaped head 46 with a circular shaft 48. The angled-plane pin 40 is rotatably fixed to a top surface 34 of the drum housing 28 and extends perpendicular upward from the top surface 34. For example, brackets 35, 37 can be attached to the top of the drum housing 28 to rotatably hold the angled-plane pins 40 firmly to the drum housing 28. In assembly, the angled-plane pin 40 is positioned between the frame 12 and the drum housing 28 such that the angular T-shaped head 46 is in rotatably slidable contact with an angular interface of the frame 12, which will be discussed in more detail below in view of FIGS. 4-6. The circular shaft 48 of the angled-plane pin 40 is in fixed contact with the one or more actuators 50 mounted on the drum housing 28. The actuators rotate the angled-plane pin 40 allowing an angled bottom surface of the pin to engage the angular interface of the mounting member 42 such that there is appropriate clamp load to the frame 12 without relying on hydraulic pressure.

As noted, the angled-plane pin 40 can be rotated by the actuator 50 located on the top surface 34 of the drum housing 28. In this example, the actuator 50 is operatively coupled to the circular shaft 48 to rotate the rotatable angled-plane pin 40. For example, the actuator 50 can include a hydraulic piston 52 fixed to the top surface 34 of the drum housing 28 and having a piston arm 54 that is rotatably coupled to a connector 56 fixed to the circular shaft 48. The connector can be a tab extending from the circular shaft 48 and an end of the piston arm 54 is pivotably coupled to the connector 56. The one more hydraulic pistons 52 can be connected using a hydraulic quick-connect to couple the hydraulic pistons 52 to the hydraulic system of the milling machine. In other embodiments, the actuator 50 can be configured as one or more hydraulic actuators, electric actuators, pneumatic actuators, etc., or combinations thereof. Moreover, the hydraulic pistons 52 can share a common hydraulic pressure chamber or may have individual hydraulic pressure chambers separate from each other or connected to each other.

In one example, one or more centering protrusions 58 can extend from a top surface 34 of the drum housing 28 to mate with correspond receiving members on the frame 12 to center the drum housing 28 relative to the frame 12. For example, the centering protrusions 58 can include a cone shaped protrusion configured to be received by mating cone-shaped cavities on the frame 12.

In operation, when the one or more actuators 50 attached to the drum housing 28 retracts or expands, the angled-plane pin 40 coupled to the actuator 50 rotates relative to the angular interface of the frame 12. The rotation of the angled-plane pin 40 draws the drum housing 28 up to the frame 12 ensuring a clamp load on the frame 12. Additionally, the rotation of the angled-plane pins 40 in the direction opposite to the aforementioned direction may facilitate in quick changing the milling assembly 20.

Figure 4:
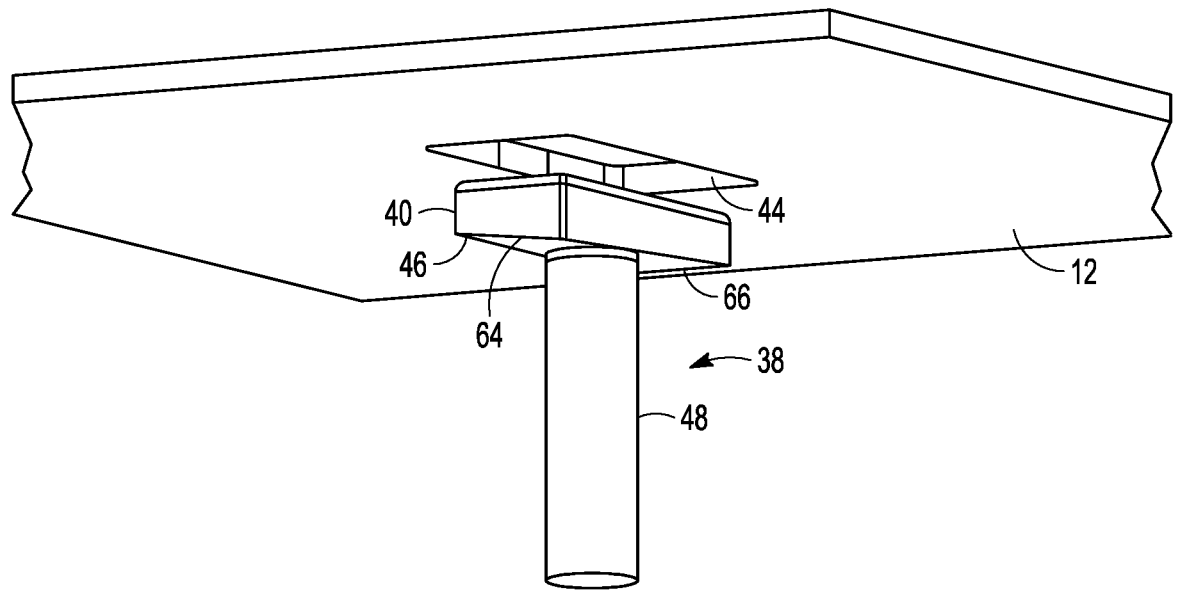
FIG. 4 shows a perspective view of an angled-plane pin being mount to a frame, in accordance with one embodiment.
Figure 5:
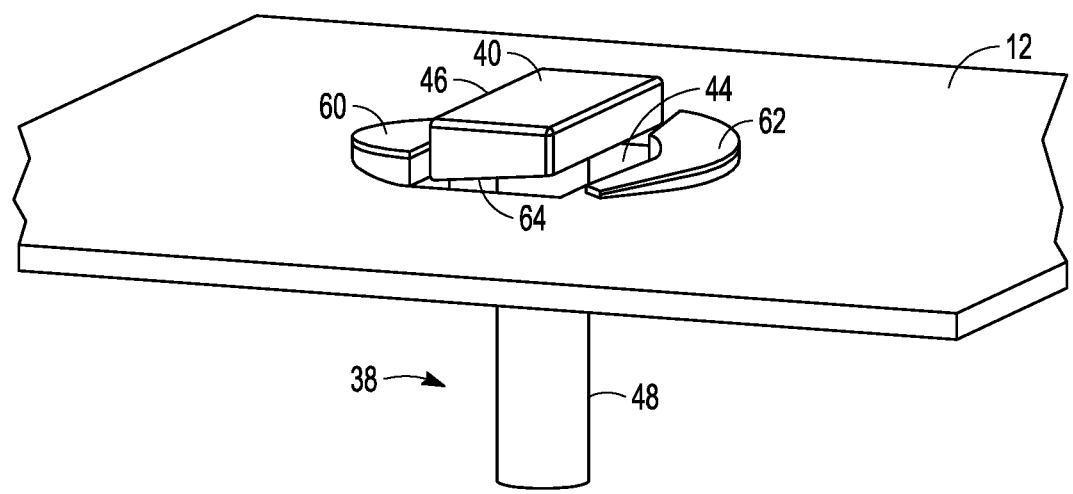
FIG. 5 shows a perspective view of the angled-plane pin being mount to the frame of FIG. 4, in accordance with one embodiment.
Figure 6:
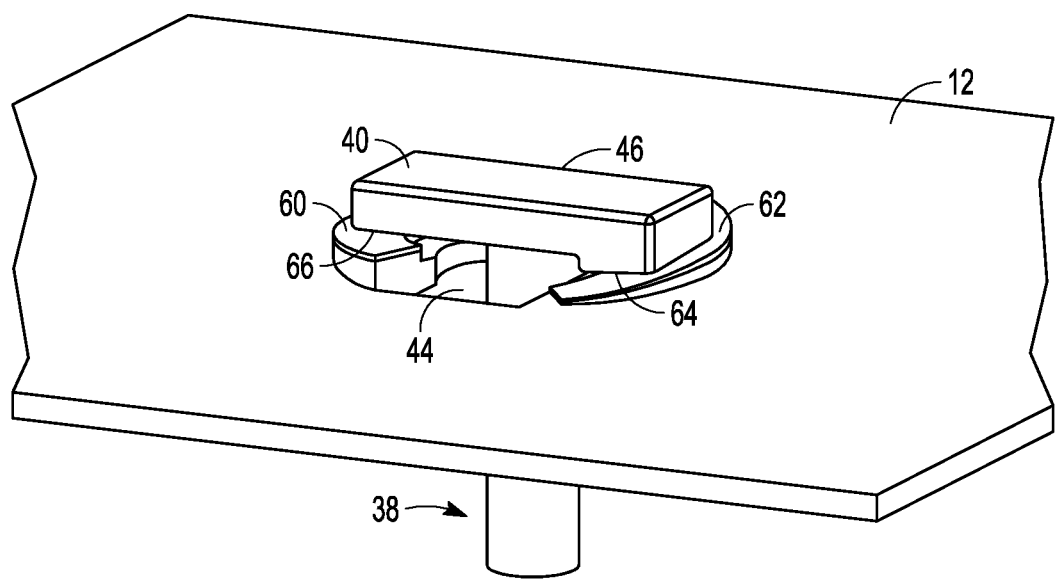
FIG. 6 shows a perspective view of the angled-plane pin being mount to the frame of FIG. 4, in accordance with one embodiment.

FIGS. 4-6 show further details of the interaction between the angled plane pin 40 and the mounting member 42 of the frame 12, in accordance with one embodiment. FIG. 4 shows a perspective view of the angled-plane pin 40 before being mounted to the frame 12, FIG. 5 shows a perspective view of the angled-plane pin 40 during mounting and FIG. 6 shows a perspective view of the angled-plane pin 40 after mounting, in accordance with one embodiment.

In this example, the mounting member 42 can include the slot 44 and can include angled surfaces 60, 62 adjacent to the slot 44. The angled-plane pin 40 includes the T-shaped head 46 connected to the circular shaft 48, where a lower surface of the T-shaped head 46 includes two angled surfaces 64, 66, with one of the two angled surfaces 64, 66 on each side of the circular shaft 48. One of the two angled surfaces 64, 66 is angled in a first direction and the second of the two angled surfaces 64, 66 is angled in an opposite direction relative to the first angled surface.

The angled-plane pin 40 enters through the slot 44 until the head 46 is above the slot 44 (see FIG. 5). The angled-plane pin 40 is then positioned such that the angular T-shaped head 46 is in rotatably slidable contact with the angled interface of the frame 12 provided by angled surfaces 60, 62. The rotation of the angled-plane pin 40 draws the drum housing up relative to the frame 12 ensuring a clamp load on the frame 12. Additionally, the rotation of the angled-plane pins 40 in an opposite direction can facilitate in quick changing the milling assembly 20. The angled plane pins 40 reacts with the opposing plane angled surfaces 60, 62 on the frame 12. This gives the ability for the milling assembly 20 to draw up to the frame 12 and ensure there is clamp load to the frame 12 without relying on hydraulic pressure.

Figure 7:
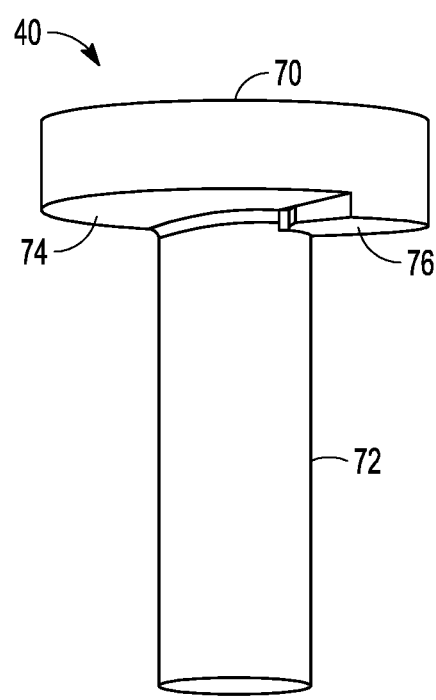
FIG. 7 shows a perspective view of an angled-plane pin, in accordance with one embodiment.

FIG. 7 shows a perspective view of an angled-plane pin 40, in accordance with one embodiment. In this example, the rotatable angled-plane pin 40 includes a circular head 70 on a circular shaft 72, where a lower surface 74 of the head 70 includes an angled-plane surface 76. In this example, the mounting member on the frame 12 can have a corresponding cam-like angled surface so as to receive the circular head and draw the angled plane pin 40 up to the frame, similar to as discussed above.

Referring to FIGS. 1-6, in operation to mount the milling assembly 20 to the frame 12, the frame 12 may be lowered onto the milling assembly 20 positioned below the mounting members 42 via the lifting columns 18. The centering protrusions 58 ensure that there is proper alignment between the mounting members 42 and the angled-plane pins 40. The actuators 50 on the drum housing 28 can be coupled to the hydraulics system of the milling machine. When the one or more actuators 50 attached to the drum housing 28 retract or expand, the angled-plane pin 40 coupled to the actuator 50 rotates relative to the angular interface of the frame 12. The rotation of the angled-plane pin 40 can draw the drum housing 28 up to the frame 12 ensuring a clamp load on the frame 12. Additionally, the rotation of the angled-plane pins 40 in the direction opposite to the aforementioned direction may facilitate in quick changing the milling assembly.

Next, the cutting rotor 22 can operatively connected to the power source 14 to power the cutting rotor 22 during operation of the cold planer 10. For example, a quick connection system may be provided that may allow the cutting rotor 22 to engage to belts, chains, or other mechanisms that cause the cutting rotor 22 to rotate.

Figure 8:
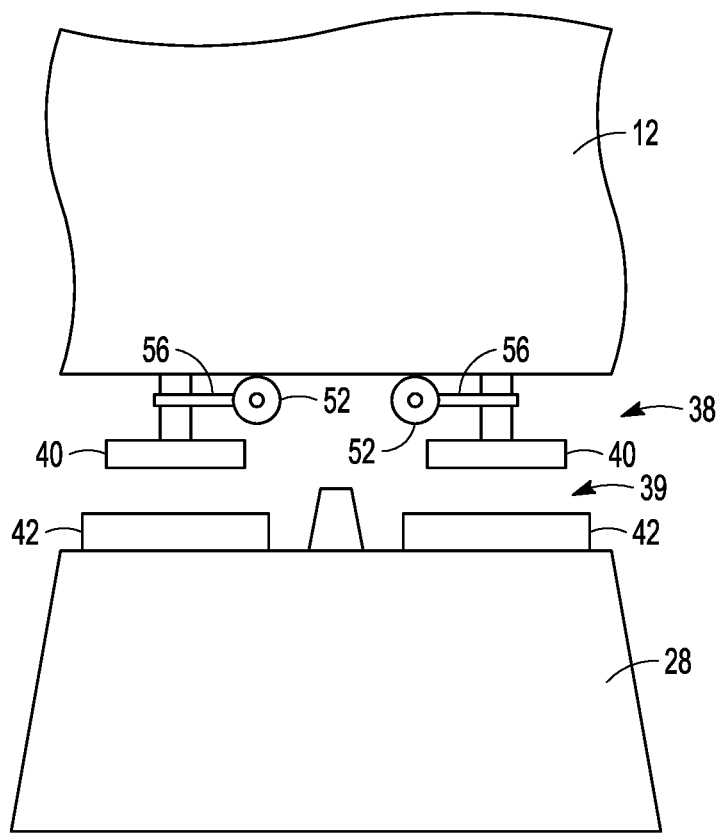
FIG. 8 shows aside view of a drum housing and a frame, in accordance with one embodiment.

FIG. 8 shows another embodiment where the drum housing 28 is mounted to the frame 12 using the connecting assembly 39. This embodiment is an opposite embodiment to the embodiment discussed with reference to FIGS. 2-7. Similar parts are referred to with same reference signs. As one skilled in the art will appreciate, configuration and/or arrangement of those parts with same reference signs may correspond to each other. Furthermore, all kinds of conceivable modifications discussed with reference to the embodiment shown in FIGS. 2-7 may be correspondingly applicable to the embodiment shown in FIG. 8.

In the embodiment shown in FIG. 8, the locking mechanism 38 is fixed to the frame 12 such that the angled plane pins 40 are rotatably mounted to a bottom surface of the frame 12 and operatively coupled to the actuators, such as hydraulic pistons 52, also mounted to the bottom surface of the frame 12. The mounting members 42 are coupled to the drum housing 28. The present embodiment otherwise functions as described above.

INDUSTRIAL APPLICABILITY

The present system is applicable to a milling assembly for a cold planer or a reclaimer. The milling assembly is suitable as a milling unit of a cold planer for removing at least part of a surface of a paved area such as a road, bridge, and a parking lot. In some embodiments, the milling assembly as disclosed herein may be also applicable as a milling unit of a surface miner in surface mining applications, for example, for mining coal deposits in an open pit mine.

As noted, some users want the ability to quickly and easily swap out milling assemblies for different width rotors. Or, it may be desirable to remove the milling assembly from the frame, for example to allow transportation of the cold planer or to replace a worn or damaged milling assembly. The present system provides a technique to perform such an operation by the rotation of the angled-plane pin 40 that draws the drum housing 28 up to the frame 12 ensuring a clamp load on the frame 12.

Figure 9:
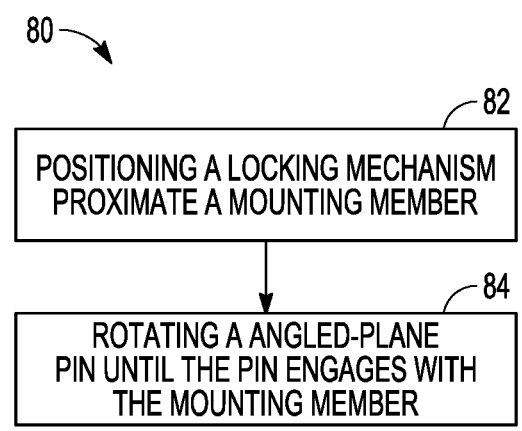
FIG. 9 shows a flowchart of a method of mounting a milling assembly to a milling machine frame, in accordance with one embodiment.

FIG. 9 shows a flowchart of a method 80 of mounting a milling assembly to a milling machine frame, in accordance with one embodiment. The method will be discussed referring to all of the FIGs discussed above.

In this example, the method can include positioning (82) a locking mechanism 38 fixed to the drum housing 28 of the milling assembly 20 proximate a mounting member 42 on the frame 12 of the milling assembly 20, the locking mechanism 38 including a rotatable angled-plane pin 40 configured to connect to the mounting member 42; and rotating 84 the rotatable angle-planed pin 40 until the rotatable angled-plane pin 40 engages with the mounting member 42 and clamps the drum housing 28 to the frame 12 by bringing the drum housing 28 and the frame 12 closer together.

In an example, the angled-plane pin 40 can include the T-shaped head 46 connected to the circular shaft 48, wherein the lower surface of the T-shaped head 46 includes two angled surfaces 64,66, with one of the two angled surfaces 64,66 on each side of the circular shaft 48, where one of the two angled surfaces 64,66 is angled in a first direction and the second of the two angled surfaces 64,66 is angled in an opposite direction relative to the first angled surface. The mounting member 42 includes the one or more slots 44 formed in the frame 12 to receive the angled-plane pin 40 therethrough. The mounting member 42 further includes angled surfaces 60, 62 adjacent the one or more slots 44 which correspond to the angled mounting surfaces 64, 66 of the rotatable angled-plane pin 40.

The above detailed description is intended to be illustrative, and not restrictive. The scope of the disclosure should, therefore, be determined with references to the appended claims, along with the full scope of equivalents to which such claims are entitled.

What is claimed is:

1. A milling machine comprising:
  a frame;
  a milling assembly including a drum housing; and
  a connecting assembly for mounting the drum housing to the frame, the connecting assembly including:
    a mounting member on one of the frame or the drum housing; and
    a locking mechanism fixed to the other one of the frame or the drum housing, the locking mechanism including a rotatable angled-plane pin configured to connect to the mounting member,
  wherein the angled-plane pin includes a head connected to a shaft and is rotatably fixed to a surface of the one of the frame or the drum housing, and
  wherein the rotatable angled-plane pin is rotated by an actuator located on the surface of the one of the frame or the drum housing and operatively coupled to the shaft to rotate the rotatable angled-plane pin.

2. The milling machine of claim 1, wherein the mounting member includes one or more receiving portions on the one of the frame or the drum housing to receive the rotatable angled-plane pin.

3. The milling machine of claim 1,
wherein the mounting member includes one or more slots, and
wherein the mounting member further includes angled surfaces adjacent to the one or more slots corresponding to an angled surface on the rotatable angled-plane pin.

4. The milling machine of claim 1,
wherein the head is a T-shaped head connected to the shaft, and
wherein a lower surface of the T-shaped head includes two angled surfaces, with one of the two angled surfaces on each side of the shaft, where one of the two angled surfaces is angled in a first direction and the second of the two angled surfaces is angled in an opposite direction relative to the first angled surface.

5. The milling machine of claim 1, wherein the actuator includes a hydraulic piston fixed to the surface of the one of the frame or the drum housing and having a piston arm that is rotatably coupled to a connector fixed to the shaft.

6. The milling machine of claim 1, further including one or more centering protrusions extending from a top surface of the drum housing.

7. The milling machine of claim 1, wherein a lower surface of the head includes an angled-plane surface.

8. The milling machine of claim 1, wherein the milling assembly includes a rotatable milling drum having a plurality of cutting tools disposed thereon.

9. A milling assembly comprising:
a drum housing holding a rotatable milling drum; and
a locking mechanism fixed to the drum housing for mounting the milling assembly to a frame of a milling machine, the locking mechanism including a rotatable angled-plane pin configured to connect to a corresponding mounting member on the frame,
wherein the rotatable angled-plane pin includes a head connected to a circular shaft and is rotatably fixed to a top surface of the drum housing.

10. The milling assembly of claim 9,
wherein the head is a T-shaped head connected to the circular shaft, and
wherein a lower surface of the T-shaped head includes two angled surfaces, with one of the two angled surface on each side of the circular shaft, where one of the angled surface is angled in a first direction and the second of the two angled surface is angled in an opposite direction relative to the first angled surface.

11. The milling assembly of claim 9, wherein the rotatable angled-plane pin is adapted to be rotated by an actuator located on the top surface of the drum housing and operatively coupled to the circular shaft to rotate the rotatable angled-plane pin.

12. The milling assembly of claim 11, wherein the actuator includes a hydraulic piston fixed to the top surface of the drum housing and having a piston arm that is rotatably coupled to a connector fixed to the circular shaft.

13. The milling assembly of claim 9, further including one or more centering protrusions extending from the top surface of the drum housing.

14. The milling assembly of claim 9, wherein the head is circular, where a lower surface of the head includes an angled-plane surface.

15. A method of connecting a milling assembly to a milling machine frame, the method comprising:
positioning a locking mechanism fixed to one of a drum housing of a milling assembly or a frame of the milling machine proximate a mounting member on the other one of the frame or the drum housing, the locking mechanism including a rotatable angled-plane pin configured to connect to the mounting member; and
rotating the rotatable angle-planed pin until it engages with the mounting member and clamps the drum housing to the frame,
wherein said rotating the rotatable angled-plane pin is by an actuator located on a surface of the one of the frame or the drum housing and operatively coupled to a shaft to rotate the rotatable angled-plane pin,
wherein the actuator includes a hydraulic piston fixed to the surface of the one of the frame or the drum housing and having a piston arm that is rotatably coupled to a connector fixed to the shaft.

16. The method of claim 15, wherein the angled-plane pin includes a T-shaped head connected to the shaft, wherein a lower surface of the T-shaped head includes two angled surfaces, with one angled surface on each side of the shaft, where one of the angled surface is angled in a first direction and the second of the two angled surface is angled in an opposite direction relative to the first angled surface, and further wherein the mounting member includes one or more slots, and wherein the mounting member further includes angled surfaces adjacent the one or more slots corresponding to the angled mounting surfaces of the rotatable angled-plane pin.

* * * * *